United States Patent [19]

Tamura et al.

[11] Patent Number: 4,969,010

[45] Date of Patent: Nov. 6, 1990

[54] COPYING MACHINE

[75] Inventors: Takashi Tamura, Tokyo; Shigeru Okazaki; Naoki Otomo, both of Hachioji, all of Japan

[73] Assignee: Konica Corporation, Tokyo, Japan

[21] Appl. No.: 274,451

[22] Filed: Nov. 21, 1988

[30] Foreign Application Priority Data

| | | | |
|---|---|---|---|
| Nov. 26, 1987 | [JP] | Japan | 62-298810 |
| Dec. 16, 1987 | [JP] | Japan | 62-317693 |
| Dec. 17, 1987 | [JP] | Japan | 62-319901 |

[51] Int. Cl.[5] .................. G03B 27/62

[52] U.S. Cl. .................. 355/75; 355/200

[58] Field of Search .................. 355/75, 76, 133, 130, 355/308, 309, 200

[56] References Cited

U.S. PATENT DOCUMENTS

| | | | |
|---|---|---|---|
| 4,124,296 | 11/1978 | Kishi et al. | 355/75 |
| 4,609,276 | 9/1986 | Mitzutani | 355/309 |
| 4,641,947 | 2/1987 | Ishida et al. | 355/200 |

*Primary Examiner*—Michael L. Gellner
*Assistant Examiner*—Khanh Dang
*Attorney, Agent, or Firm*—Jordan B. Bierman

[57] ABSTRACT

The present invention relates to copying machine, which comprises: upper and lower bodies which are bound by a hinge on one side, and a counterbalance mechanism installed in the vicinity of the hinge which works at the time of opening and closing the upper body within a predetermined angle, and stops functioning at the time of opening the upper body when the upper body opens beyond the predetermined angle.

12 Claims, 6 Drawing Sheets

COPYING MACHINE

FIELD OF THE INVENTION

The invention relates to a copying machine comprising upper and lower bodies which are bound by a hinge on one side, and the upper body is designed to open at a predetermined angle.

BACKGROUND OF THE INVENTION

A copying machine comprises, in general, upper and lower bodies which can be opened by a hinge with a paper passage from a paper feeding part to a paper discharging part as its boundary and designed to facilitate the removal of jamming caused by a recording sheet and the maintenance, adjustment, and repair of the machine.

The upper and lower bodies of such type copying machine are bound by a hinge on one side, and the upper body is forced by a spring in order to open at a predetermined angle. However, a conventional spring forcing means has been a torsion bar type or a pneumatic spring type so that the spring always works at the time of opening the upper body. Therefore, at the time of maintenance, adjustment, and repair of the machine, unless otherwise the spring force is completely released, there have been difficulties in removal of the upper body from the lower body and its reassembly, causing low efficiency of the operation.

This invention is designed to solve said problems and to provide a new type copying machine, in which a spring securely works at the time of opening and closing the upper body and the spring can be easily released at the time of removal of the upper body from the lower body and its reassembly in order to carry out the maintenance, adjustment, and repair of the machine.

SUMMARY OF THE INVENTION

In order to achieve the foregoing object and facilitate the maintenance, adjustment, and repair of the machine, this invention provides a new type copying machine comprising upper and lower bodies which are bound by a hinge on one side and a counter balance mechanism near the hinge binding part which works at the time of opening and closing the upper body within a predetermined angle and stops functioning at the time of opening the upper body beyond the predetermined angle.

According to this invention, when the upper body is closed, a large moment load resisting a spring of counterbalance mechanism falls on the lower body. An object of this invention is to provide a lightweight type copying machine with sufficient strength; therefore, main members on which the moment load is imposed are manufactured of metal having sufficient strength, and other parts of the structure, synthetic resin molds.

In this copying machine, a lock mechanism is required to securely maintain a firm binding condition at the time of closing the upper body. Thus, another object of this invention is to provide a simple device which can securely lock the upper and lower bodies together. The present invention specifically relates to a copying machine, which comprises:

(a) upper and lower bodies which are bound by a hinge on one side, and (b) a counterbalance mechanism installed in the vicinity of the hinge which works at the time of opening and closing the upper body within a predetermined angle, and stops functioning at the time of opening the upper body when it opens beyond the predetermined angle.

DETAILED DESCRIPTION OF THE PREFERRED EMBODIMENT

Figure 1:
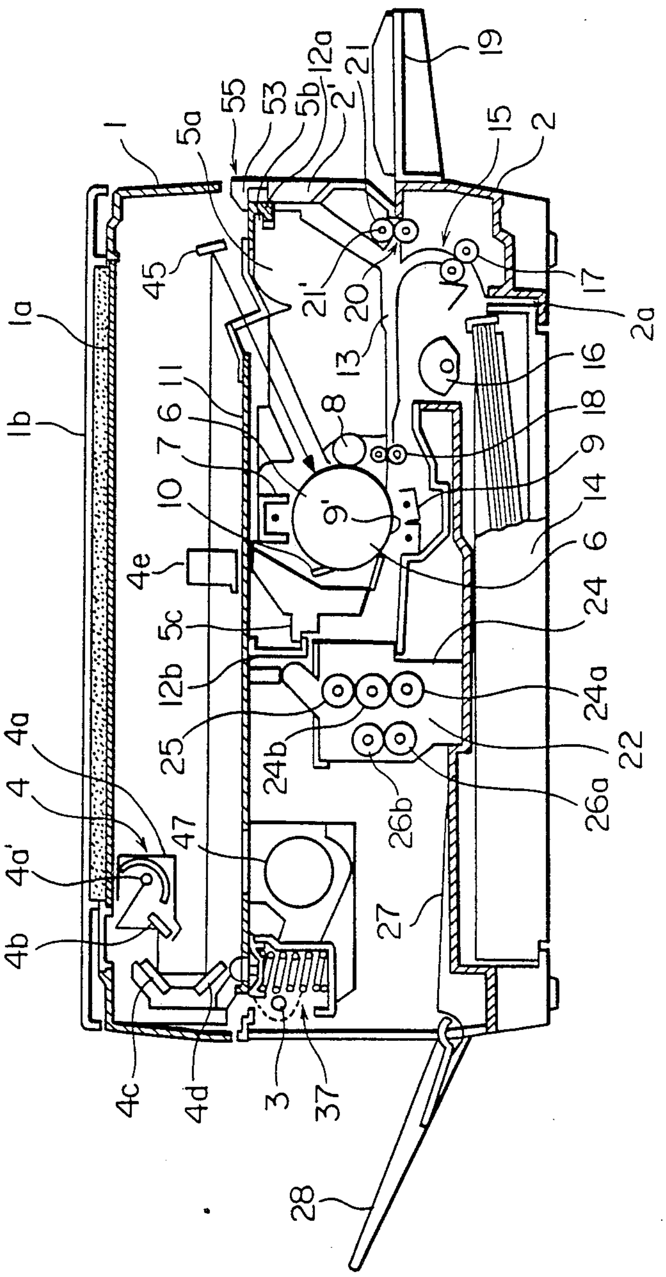
FIG. 1 is a schematic front elevation in section at the time of closing the upper body.

According to the most preferred embodiment, the copying machine of the present invention has hinged upper body 1 and lower body 2, and a counterbalance mechanism 37 located between the upper body 1 and the lower body 2 which functions within a predetermined angle of use of the hinge 3, and the counterbalance mechanism 37 comprises, (a) a rod 39 having ends with larger diameter than that of the middle portion of the rod.

(b) a spring means 40 which is fitted over the rod 39, (c) a washer 42 which is fitted to the rod 39, not being off the rod because of the larger diameter upper end 41 of the rod, and controls movement of the spring 40, (d) a reinforcement frame 43 of the upper body 1 which engages the washer 42, (e) a lower surface board 38 of the lower body 2 in which the lower end 39*a* of the rod 39 is mounted.

The present invention will now be described based on a preferred embodiment shown in the attached drawings. In FIGS. shown by 1 is an upper body and 2, a lower body. These upper and lower bodies 1, 2 are bound by means of a hinge binding part 3 so as to open. A platen 1*a* is fitted on top of the upper body 1, and an original cover 1*b* is mounted movably on the platen in order to press against it.

Shown by 4 is an optical system comprising a light source 4*a'* which can move while applying light to an original copy on the platen 1*a*, a first mirror 4*b* fixed to the light source unit 4*a*, a second and third mirrors 4*c* and 4*d* deflecting the reflection light from the first mirror, a variable power lens 4*e* and a fourth mirror 45.

Shown by 5 is a developing unit disposing a photoreceptor drum 6 in the center of a casing 5*a*, and a charging part 7, a developing part 8, a drum exposure part 9' corresponding to a transfer part 9, and a cleaning part 10 in the casing. The developing unit 5, movable toward the front side (an operator side), is suspended from rails 12*a*, 12*b* installed beneath a bottom plate 11 (a bottom plate of the optical system) of the upper body 1 by means of projections 5*b*, 5*c* provided on both sides of the casing 5*a*.

The transfer part 9 is installed in the lower body 2 as opposed to the photoreceptor drum 6 via a paper passage 13 formed between them.

Shown by 14 is a storage cassette storing stacked copy sheets, drawable from the front side, which is installed in a space 2*a* under the lower body 2.

Shown by 15 is a paper feeding unit comprising a semicircular roller 16 which forwards copy sheet one at a time from the cassette 14 to the paper passage 13, a paper feeding roller 18 which timely feeds paper between the photoreceptor drum 6 and the transfer part 9, and a manual paper feed tray 19, capable of insertion and extraction, on the outer surface of a side wall of the lower body 2. A manual paper feed tray passage 20 connecting to the manual paper feed tray 19 is equipped with a manual paper feed roller 21.

Shown by 22 is a fixing unit which fixes a toner picture by applying heat and pressure on the copy sheet after being transferred in the transfer part 9. This fixing unit 22 is equipped with a fixing roller 24*a*, a press roller 24*b*, and a cleaning roller 25 on a frame body 23 fixed on the lower body 2, as well as paper discharge rollers 26*a* and 26*b*. The paper discharged from these discharge roller 26*a*, 26*b* is stacked on a paper discharge tray 28, capable of insertion and extraction, fixed to the outer wall, extendedly from an inner bottom 27 of the other side of the lower body 2.

Figure 2:
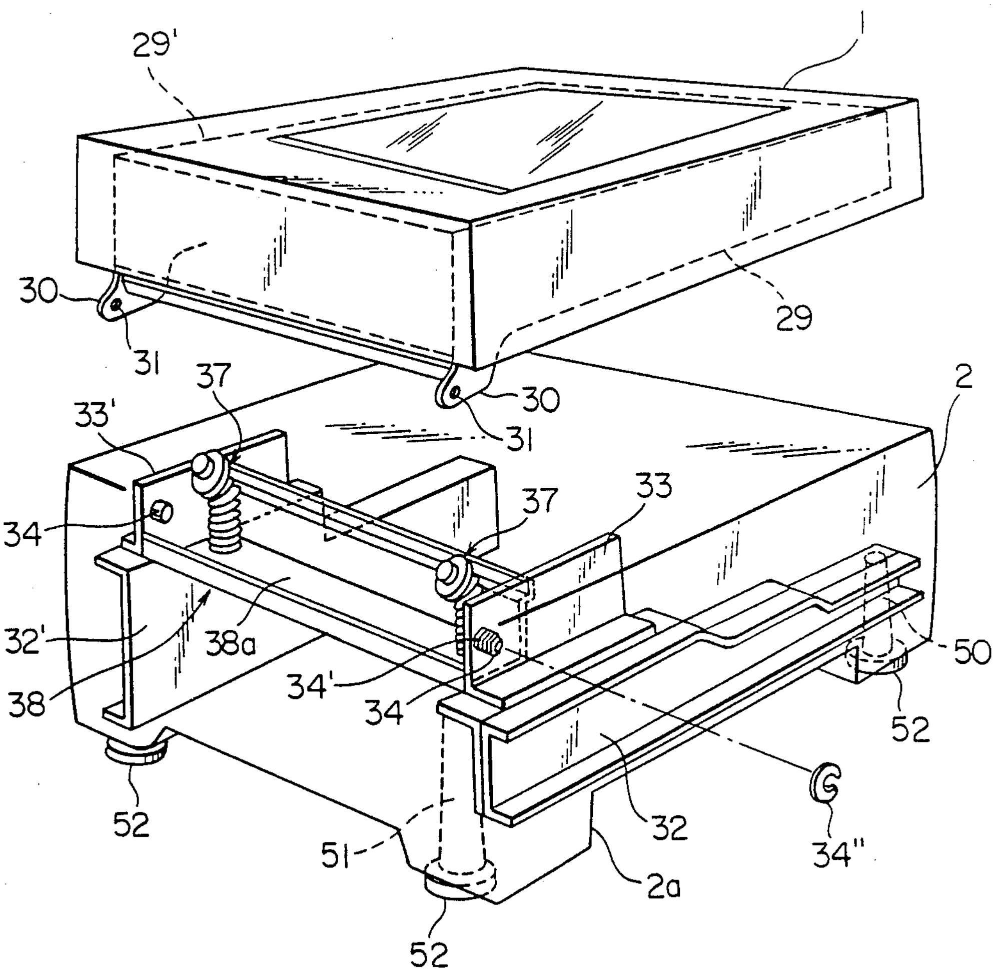
FIG. 2 is an exploded perspective view showing reinforcement of the lower body and the hinge binding part.

The foregoing hinge binding part 3 is, as shown in FIG. 2, provided with a hole 31 on a projecting part 30 provided extendedly from a side edge of each of front and rear frames 29, 29' of the upper body 1 and a hinge shaft 34 horizontally and identically implanted on both sides of a box-shape member 33 installed between front and rear frames 32, 32' of the lower body 2, by which these hole and hinge shaft are connected, and a C ring 34'' is fitted in an annular groove 34' provided a point of the hinge shaft 34. Therefore, the upper body 1 is easily removed and reassembled only by being moved toward one direction along the hinge shaft after the removal of the C ring.

Figure 5:
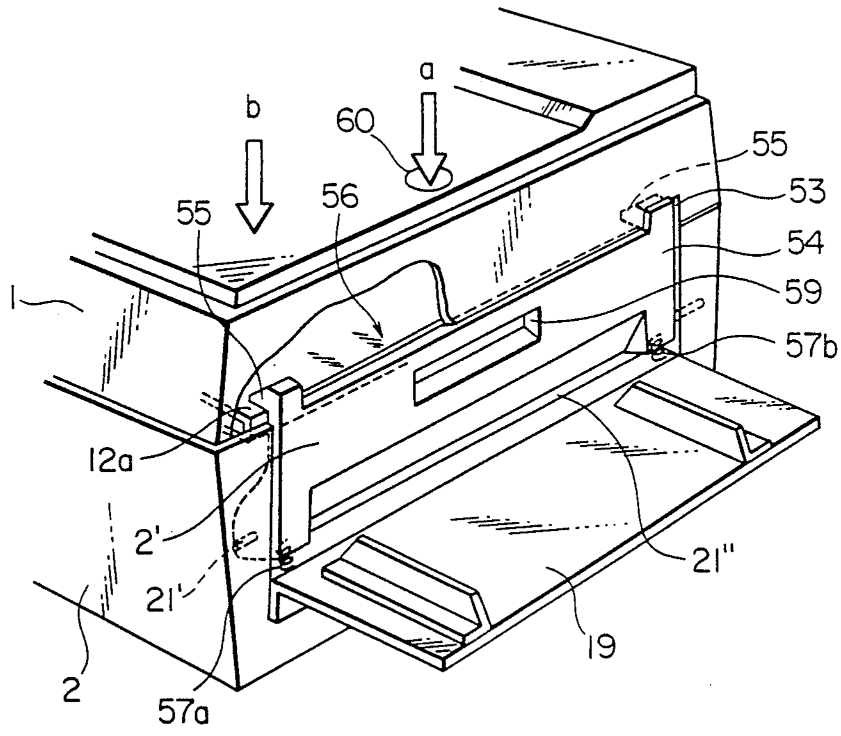
FIG. 5 is a visual fragmentary perspective view showing the lock mechanism.

In FIG. 5, shown by 55 is the lock means which keeps free end sides of the upper and lower bodies 1, 2 in closed condition. This lock means 55 can swing about the central shaft 21' of said manual paper feed roller 21. The hook (engaging part) 55 having an inclined surface 55' on the top surface is provided on the top end of right and left sides of the outer member 54, respectively, which furnishes a paper feed port 21'' in its center. This hook 55 is designed to be engaged with an end part (engaged part) 56 of the bottom 11 of the upper body 1. The upper surface of the foregoing rail 12*a* of the developing unit is utilized for this engaged part 56.

The outer member 54 is, as shown in FIG. 5, engaged counterclockwise (a direction to actualize the engagement of the hook 55) by functions of the helical compression springs 57*a*, 57*b*, respectively mounted between the right and left side lower surfaces of this outer member and the lower body 2. Therefore, when an operator tries to close and lock the upper body 1, he may just press down the top surface of the upper body 1 (by hand). Then, the lower edge part of the rail 12*a* hits on the inclined top surface 55' of the hook 55, making the outer member 54 swing clockwise by resisting functions of the helical compression springs 57*a* and 57*b*, resulting in the engagement of the lower surface of the hook 55 with the top surface of the rail 12*a*. When the operator presses down the center of the top surface of the upper body 1 as shown by an arrow a in FIG. 5, there is no problem. However, if he presses down his side of the top surface as shown by an arrow b, the lock mechanism may not work well because the rail 12*a* on his side tends to be under the hook 55 and is engaged with this hook earlier than the other side, causing insufficient engagement of the back side hook. In order to prevent this, a printed seal 60 (for example, a seal with printed pictures or letters such as "Press Here!") may be affixed to the position equivalent to the arrow a, or the helical compression spring on the far side of the machine (either 57*a* or 57*b*) may be tightened or the spring on the operator side may be omitted. Even so, a simultaneous engagement effect can be obtained.

Figure 6A:
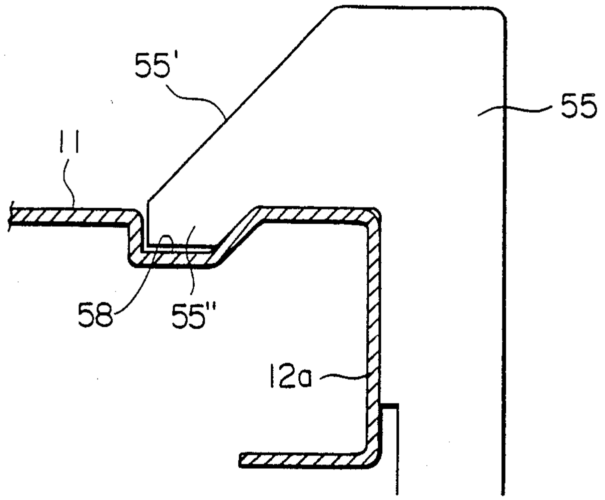
FIG. 6(*a*) and (*b*) are section views showing functions of the hook.
Figure 6B:
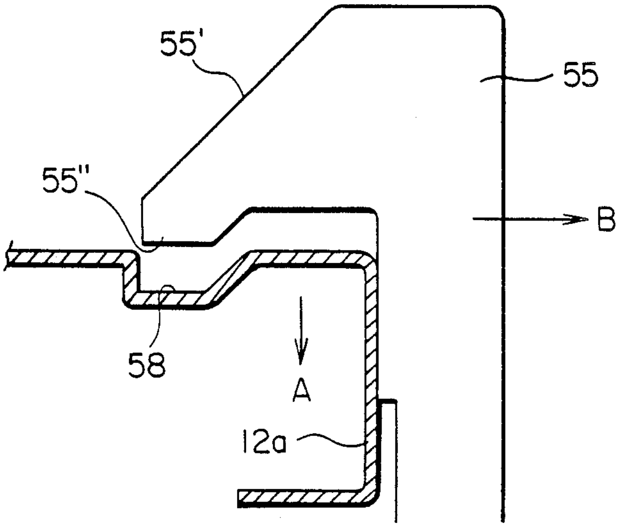

On the top surface of the rail 12*a*, the concave groove 58 is provided as shown in FIG. 6(*a*), and convex part 55'' on the lower surface of the hook 55 can be fitted into this groove. This prevents the hook 55 from releasing easily from rail 12*a*. Therefore, when the operator tries to release the engagement of the hook 55, he must press the upper body 1 once downward and make the rail 12*a* lower as shown by an arrow A in FIG. 6(*b*). Then, the convex part 55'' of the hook 55 rises from the concave groove 58. After that, unless otherwise a handle 59 is moved outward (to the direction as shown by an arrow B), the lock cannot be unfastened.

Figure 3:
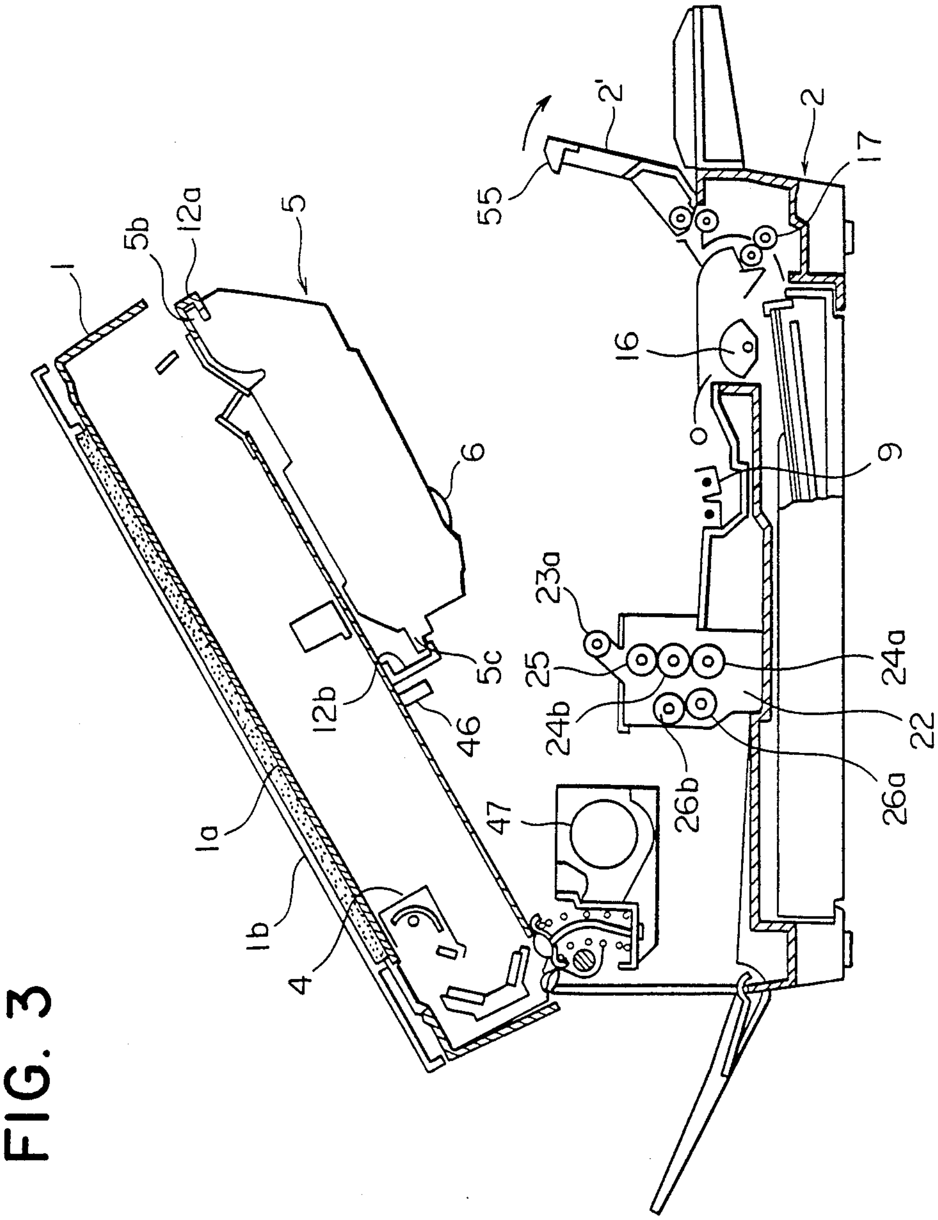
FIG. 3 is a front sectional view at the time of opening the upper body.
Figure 4A:
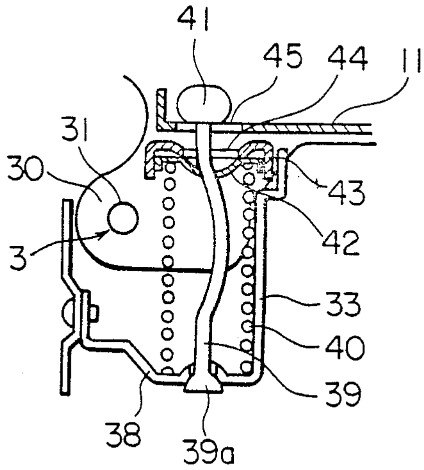
FIG. 4(*a*),(*b*) and (*c*) are explanatory drawings showing functions of the counterbalance mechanism.
Figure 4B:
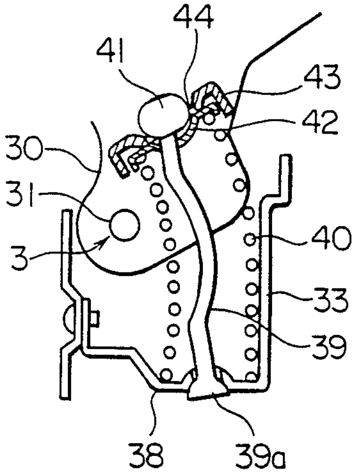
Figure 4C:
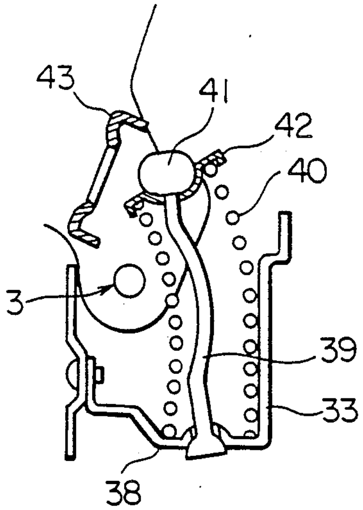

In FIG. 2 Shown by 37 is a counterbalance mechanism provided near the hinge binding part 3, which forces the upper body 1 to an open direction. As shown in FIG. 3, this counterbalance mechanism 37 causes the upper body 1 to open at a predetermined angle (approximately 30°), and it does not function beyond this angle. The counterbalance mechanism 37 is, as shown in FIG. 4(*a*), comprised of a rod 39 mounted on a spherical part 39*a* provided on the basic end of a lower surface board 38 of the box-shape member 33 and installed between the front and rear frames 32, 32' of the lower body 2, and a helical compression spring 40 fitted on the rod 39. The top end of this helical compression spring 40 is controlled by a washer 42 engaged in a spherical body (an upper end large diameter part) 41 fixed on the top end of the rod 39. That is, when the upper body 1 is closed as shown in FIG. 1, the upper end spherical body 41 fixed on the rod 39 passes through a hole 44 provided on a corresponding part of a reinforcement frame 43 installed between the projecting parts 30 and 30' comprising said hinge binding part 3, and the washer 42 keeps the helical compression spring 40 in the compressed condition directly touching the reinforcement frame 43. Therefore, when the lock means 55 is released, the helical compression spring 40 pushes the reinforcement frame 43 up through the washer 42 by its resilient action, and then, as shown in FIG. 3, the upper body 1 opens about the hinge binding part 3 as the axle. In this case, the maximum extensible volume of the helical compression spring 40 is controlled by the washer 42 engaged in the upper end spherical body 41 on the rod 39, and the spring 40 maintains the upper body 1 in the open condition at the predetermined angle, as shown in FIG. 4(*b*). In other words, the counterbalance mechanism only functions between its closed position shown in FIG. 4(*a*) and its open position shown in FIG. 4(*b*). When the upper body 1 is raised as shown in FIG. 4(*c*), the top end of the helical compression spring 40 cannot follow the movement of this upper body, and the spring action has no effect on the upper body. Therefore, in this condition, removal and reassembly of the upper body can be easily carried out by moving the upper body toward one direction from the lower body along the hinge shaft 34.

Said helical compression spring 40 is curved toward the hinge binding part 3, which results from the incurved rod 39. Since the helical compression spring is curved in such a way, the direction of the spring corresponds to a circular arc of the upper body 1 at the time of its opening about the hinge binding part 3 as the axle, leading to high efficiency of the spring. Since the helical compression spring 40 raises the upper body and the developing unit attached thereto, within the vicinity of the hinge binding part 3, sufficient resilience is required of this spring; but extraordinary resilience such as to pop open the upper body at the time of release of the lock means is not necessary.

In the foregoing embodiment, when the original copy is set on the platen 1a of the upper body 1 and pressed with the original cover 1b and the machine is started to operate, the light source 4a in the optical system 4 moves, and the original information is changed into latent images on the photoreceptor drum 6; then, they are developed into toner pictures in the developing part. The toner pictures are transferred on the copy sheet sent out from the cassette through the semicircular 16 and paper feeding rollers 18 and fixed in the fixing part. Finally the copy sheet having a copied image is discharged to the paper discharge tray.

When the sheet is jamming in the passage on the way from the cassette to the discharge part, the lock means 55 is rotated to release the hook 55′ from the rail 12a of the upper body 1, whereby the upper body 1 is opened in a clamshell form about the hinge binding part 3, which serves as the axle, by the function of the counter balance mechanism 37. In this case, since the developing unit 5 is also raised along with the upper body 1, the paper passage 13 located between the photoreceptor drum 6 and the transfer part 9 remaining on the lower body is completely exposed as shown in FIG. 3.

When removing the upper body 1 from the lower body 2 is necessary due to maintenance, adjustment, and repair, the removal operation (as well as the reassembly) can be easily carried out if the upper body 1 is raised beyond the predetermined angle, in which the counterbalance mechanism fails to function.

When the upper body is closed, the helical compression spring 40 is in compressed condition and a large moment load falls on each member of the lower body, resulting in problems on the design and structure of the machine. In order to solve these problems, in this invention, reinforcement members 32 and 32′ are integrated in the lower body.

As shown in FIG. 2, the reinforcement members 32, 32′, perpendicular to the hinge shaft 34 of the hinge binding part 3, are formed by metal deformed channel-type members and installed in the front and rear walls of the lower body, respectively. The reinforcement member 32′ in the rear wall is fixed directly against the bottom of the lower body 2, and the reinforcement member 32 in the front wall is installed between supports 50 and 51 striding across a cassette inserting part 2a.

Shown by 52 is a leg member mounted beneath the lower body 2, corresponding to both edges of said reinforcement members 32, 32′. That is, at the time of closing the upper body, loads, including a moment load, falling on the reinforcement members 32, 32′ are concentrated on the leg member 52.

As described above, according to this invention, the clamshell-type copying machine, in which the upper and lower bodies are hinged on one side, is characterized by the installation of the counterbalance mechanism provided near the hinge binding part which functions well when the upper body is opened and closed within the predetermined angle though fails to work beyond said predetermined angle. In other words, at the time of ordinary opening and closing of the upper body, the spring works well. At the time of removal and reassembly of the upper body due to maintenance, adjustment, and repair of the machine, the spring functions can be easily released which, owing to this invention, results in easy, safe work and extremely improved work efficiency.

In addition, according to this invention, the copying machine, in which the upper and lower bodies are hinged on one side and the counterbalance mechanism is provided near the hinge binding part, making the upper body open, is characterized by the reinforcement members, perpendicular to the hinge shaft of said hinge binding part, and the leg members provided under the lower body corresponding to both end parts of said reinforcement members. Therefore, most of the moment loads, caused by resiliency against the forcing power of the counterbalance mechanism toward the open direction and of the fixing unit toward the press direction, are concentrated on the leg members through the reinforcement members made from metal. According to this invention, the body main body structure is formed by synthetic resin molds in order to lighten the weight and maintain sufficient strength of the machine.

Furthermore, according to this invention, the copying machine, in which the upper and lower bodies are hinged on one side and the upper body is forced by the spring toward the open direction, is characterized by the engagement of the outer member of the lower body with the upper body. This invention makes possible the tight and secure engagement and lock by simple structure, and reduction of the number of parts because structural members can be used as outer members of the machine, leading to sharp reduction in cost.

What is claimed is:

1. A copying machine comprising;
upper and lower bodies which are bound by a hinge on one side, said upper body being adapted to open and close in relation to said lower body, and
a counterbalance mechanism installed in the vicinity of said hinge which operates during opening and closing of said upper body within a predetermined angle, and stops functioning when said upper body opens beyond said predetermined angle,
said counterbalance mechanism comprising a rod, a lower part of which is mounted in said lower body and a top part thereof which has a diameter larger than that of the remaining portion thereof, and a spring means in which said rod is provided, said top part being controlled by a stopper means installed at a top portion of said spring means.

2. A copying machine as set forth in claim 1, wherein said rod has a curved part with regard to said hinge.

3. A copying machine as set forth in claim 1, wherein said copying machine further comprises a reinforcement member attached to said lower body.

4. A copying machine as set forth in claim 1, wherein said upper and lower bodies are bound by a lock means installed in said lower body in the opposite side to said hinge so that it operates when said upper body is closed.

5. A copying machine as set forth in claim 1, wherein said upper and lower bodies are bound by a lock means installed in said lower body in the opposite side to said hinge so that it operates when said upper body is closed.

6. A copying machine having hinged upper and lower bodies, and a counterbalance mechanism located between said upper body and said lower body which functions within a predetermined angle of use of said hinge, and said counterbalance mechanism comprises, (a) a rod having ends with larger diameter than that of the middle portion of said rod, (b) a spring means which is fitted over said rod, (c) a washer which is put at the upper end of said rod and restricts movement of said spring, (d) a reinforcement frame of said upper body which engages said washer, (e) a lower surface board of said lower body in which the lower end of said rod is mounted.

7. A copying machine as set forth in claim 6, wherein said rod has a curved part with regard to said hinge.

8. A copying machine as set forth in claim 6, wherein said copying machine further comprises a reinforcement member attached to said lower body.

9. A copying machine as set forth in claim 6, wherein said upper and lower bodies are bound by a lock means installed in said lower body in the opposite side to said hinge so that it operates when said upper body is closed.

10. A copying machine as set forth in claim 8, wherein said upper and lower bodies are bound by a lock means installed in said lower body in the opposite side to said hinge so that it operates when said upper body is closed.

11. A copying apparatus comprising;

a lower body;

an upper body mounted on said lower body;

a hinge means for pivotally connecting said lower body and said upper body so that said upper body pivots around said hinge means between a closed position and an open position in relation to said lower body; and a counterbalance means including a fixed end, a coupling end, and a spring member disposed between said fixed end and said coupling end;

said fixed end being fixed to a first body being one of either of said lower body or said upper body;

said coupling end being adapted to come into engagement with a second body being the other of either of said lower body or said upper body, and to maintain the engagement while said upper body pivots within a predetermined angle from the closed position so that said spring member urges said upper body to the open position;

said coupling end being further adapted to disengage the second body when said upper body pivots beyond said predetermined angle so that upper body pivots to the open position free of said coupling end.

12. The apparatus of claim 11 wherein said fixed end is fixed to said lower body and said coupling end is adapted to engage said upper body.

* * * * *